(12) United States Patent
Belt et al.

(10) Patent No.: US 10,112,597 B2
(45) Date of Patent: Oct. 30, 2018

(54) AUTOMATIC DRIVE MODE SELECTION (71) Applicant: Ford Global Technologies, LLC, Dearborn, MI (US)

(72) Inventors: Bryan Whitney Belt, Sterling Heights, MI (US); Shunsuke Okubo, Belleville, MI (US); Craig Edward Esler, Plymouth, MI (US); Ryan J. Skaff, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 15/244,378

(22) Filed: Aug. 23, 2016

(65) Prior Publication Data

US 2018/0056973 A1    Mar. 1, 2018

(51) Int. Cl.
*B60W 20/13* (2016.01)
*B60W 20/12* (2016.01)
*B60K 6/48* (2007.10)
*B60W 10/06* (2006.01)
*B60W 10/08* (2006.01)
*B60W 10/26* (2006.01)

(52) U.S. Cl.
CPC .............. *B60W 20/13* (2016.01); *B60K 6/48* (2013.01); *B60W 10/06* (2013.01); *B60W 10/08* (2013.01); *B60W 10/26* (2013.01); *B60W 20/12* (2016.01); *B60W 2510/244* (2013.01); *B60W 2520/10* (2013.01); *B60W 2710/244* (2013.01); *B60Y 2200/92* (2013.01); *B60Y 2300/182* (2013.01); *Y10S 903/93* (2013.01)

(58) Field of Classification Search
CPC ...... B60W 20/12; B60W 10/06; B60W 10/08; B60W 10/26; B60W 2510/244; B60W 2520/10; B60W 2710/244; B60K 6/48; B60Y 2200/92; B60Y 2300/182; Y10S 903/93

See application file for complete search history.

(56) References Cited

U.S. PATENT DOCUMENTS

| 8,060,266 B2 | 11/2011 | Hidaka et al. | |
|---|---|---|---|
| 8,068,947 B2 | 11/2011 | Conlon et al. | |
| 8,170,737 B2 * | 5/2012 | Tate, Jr. ................ | B60W 10/06 701/105 |
| 8,428,803 B2 | 4/2013 | Komatsu et al. | |
| 8,676,418 B2 | 3/2014 | Yoshimi | |
| 8,958,936 B2 | 2/2015 | Treharne et al. | |
| 8,965,614 B2 | 2/2015 | Nissato | |
| 9,315,190 B2 | 4/2016 | Yu | |
| 9,327,589 B2 | 5/2016 | Conlon et al. | |
| 2006/0048988 A1 * | 3/2006 | Dreibholz ............. | B60K 6/442 180/213 |
| 2009/0306842 A1 * | 12/2009 | Oyobe ..................... | B60L 7/18 701/22 |
| 2010/0185349 A1 * | 7/2010 | Harada ................... | B60K 6/365 701/22 |
| 2011/0046834 A1 | 2/2011 | Grider et al. | |
| 2012/0179314 A1 | 7/2012 | Gilman et al. | |

(Continued)

*Primary Examiner* — Hussein Elchanti
(74) *Attorney, Agent, or Firm* — Brooks Kushman P.C.

(57) ABSTRACT

A vehicle includes, an engine, an electric machine having an associated battery, and a controller. The controller is configured to disable the engine and operate the electric machine to propel the vehicle when a proximity of the vehicle to a destination is less than a drive range of the battery.

20 Claims, 4 Drawing Sheets (56) References Cited

U.S. PATENT DOCUMENTS

| | | | |
|---|---|---|---|
| 2014/0121867 A1* | 5/2014 | Tamai | B60W 10/06 |
| | | | 701/22 |
| 2014/0195092 A1* | 7/2014 | Saito | B60W 10/02 |
| | | | 701/22 |
| 2014/0229043 A1* | 8/2014 | Frank | B60W 20/20 |
| | | | 701/22 |
| 2015/0097512 A1 | 4/2015 | Li et al. | |
| 2015/0239460 A1* | 8/2015 | Manickaraj | B60W 10/06 |
| | | | 701/22 |
| 2015/0336568 A1 | 11/2015 | Porras et al. | |
| 2016/0339906 A1* | 11/2016 | Nefcy | B60K 6/547 |
| 2016/0368483 A1* | 12/2016 | Nawata | B60W 10/06 |
| 2017/0113677 A1* | 4/2017 | Endo | B60W 20/40 |

* cited by examiner

Fig-4

AUTOMATIC DRIVE MODE SELECTION

TECHNICAL FIELD

This disclosure relates to drive mode selection in operation of a hybrid vehicle. More specifically, this disclosure relates to automatic drive mode selection based on the proximity of the hybrid vehicle to a destination.

BACKGROUND

Example hybrid vehicles include hybrid electric vehicles (HEVs), and plug-in hybrid electric vehicles (PHEVs). HEVs and PHEVs have more than one source of power. An electric machine may be configured to propel the vehicle and uses a battery as a source of energy. For the PHEV, the battery may be recharged using an external power source, such as a charging station. An engine may also be configured to propel the vehicle and use fuel as a source of energy. The PHEV can be controlled to use the electric machine and/or the engine to operate the vehicle and meet user demand. In this way, hybrid vehicles differ from conventional motor vehicles because conventional motor vehicles rely exclusively on an internal combustion engine to drive the vehicle.

SUMMARY

A method for controlling a vehicle includes, in response to a vehicle speed exceeding a predetermined threshold, switching, by a controller, the vehicle from a charge deplete mode to a charge sustain mode. The method further includes, in response to a range of a battery exceeding an expected drive distance, switching, by the controller, the vehicle from the charge sustain mode to the charge deplete mode.

In some aspects, a state of charge of a traction battery generally decreases in the charge deplete mode. The state of charge of the traction battery may be generally maintained in the charge sustain mode. The range may be, for example, a distance associated with a state of charge of the battery. The distance associated with the state of charge of the battery may be a distance the vehicle may travel before the state of charge is depleted below a predefined threshold, such as 5%. The expected drive distance may be a distance from a geographic location of the vehicle to a geographic destination.

In some approaches, the geographic destination is a geographic location entered by a user. In other approaches, the geographic destination is a geographic location stored in a memory.

A method for controlling a vehicle may include, in response to a proximity of the vehicle to a destination being less than a drive range of a traction battery, disabling an engine and enabling an electric machine to propel the vehicle.

A vehicle includes, an engine, an electric machine having an associated battery, and a controller. The controller is configured to disable the engine and operate the electric machine to propel the vehicle when a proximity of the vehicle to a destination is less than a drive range of the battery.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Furthermore, although the present disclosure describes the various embodiments in terms of plug-in hybrid electric vehicles, any hybrid electric vehicle having an interface permitting the user to select or control the operating mode of the vehicle may be used.

Hybrid vehicles, such as hybrid electric vehicles (HEVs) and plug-in hybrid electric vehicles (PHEVs), are provided with more than one source of power. Besides the gasoline fuel energy, a hybrid vehicle also has an additional energy source of electrical energy stored in the battery, which may be electric energy from the electric grid deposited in the vehicle's battery during charging. The power management of the hybrid vehicle allocates the drive power demand of the vehicle to one or both of the two energy sources in order to achieve an improved fuel economy and meet the other comparable HEV/PHEV control objectives. While conventional HEVs may be operated in order to maintain the battery State of Charge (SOC) around a constant level, it may be desirable for PHEVs to use as much pre-saved battery electric (grid) energy as possible before the next charge event (when the vehicle is "plugged-in"). To increase fuel economy, the relatively inexpensive, grid-supplied electric energy may be preferentially used to save as much gasoline fuel as possible.

Figure 1:
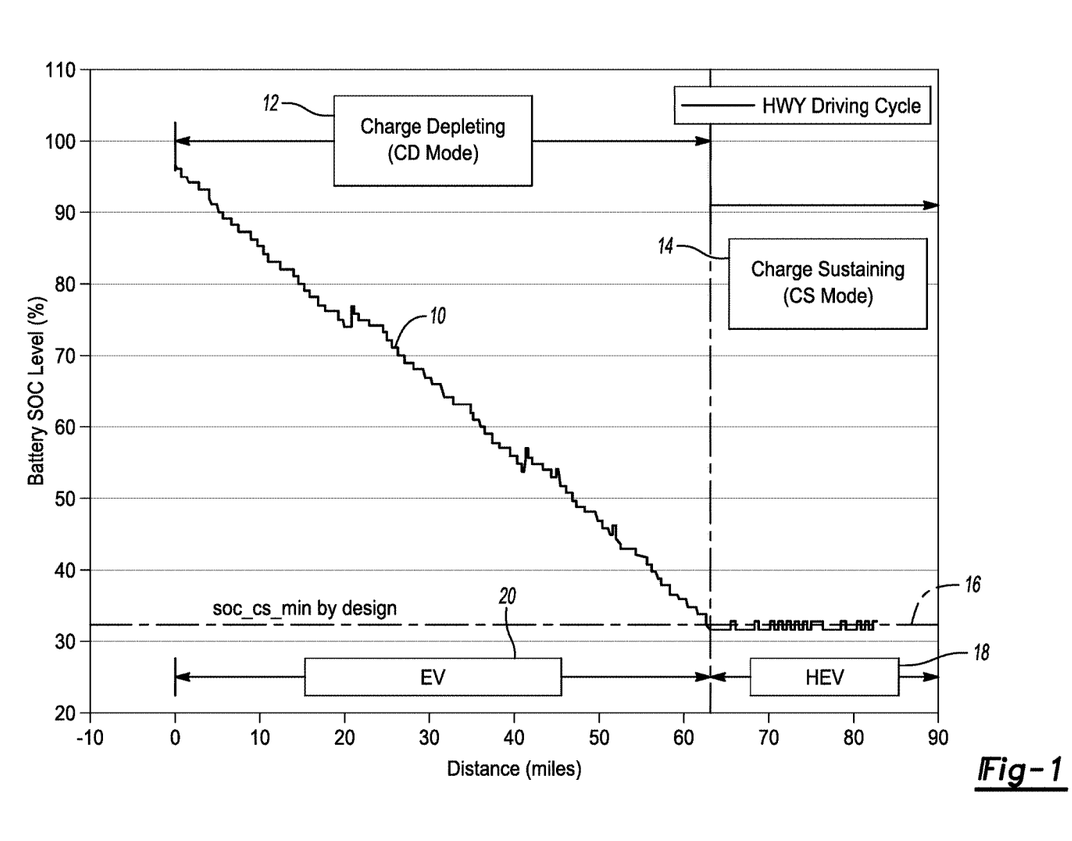
FIG. 1 is a chart illustrating two modes of operation for a hybrid electric vehicle.

Referring to FIG. 1, a hybrid vehicle may have two basic operating modes that control an energy level, or State of Charge (SOC) 10, of battery. In a Charge Depleting (CD) mode 12, electric energy of the battery may be primarily used to propel the vehicle. The engine assists the vehicle drive power supply only in certain driving conditions or at excessive drive power requests during the CD mode 12. One characteristic of the CD mode 12 is that the electric motor consumes more energy from the battery than can be regenerated.

In a Charge Sustaining (CS) mode 14, the vehicle reduces the electric motor propulsion usage to be able to keep the battery's SOC 10 at a constant or approximately constant level by increasing the engine propulsion usage. In operation, the vehicle switches to CS mode 14 once the battery SOC 10 decreases to a predefined charge sustaining level 16. In this mode, the vehicle is primarily powered by the engine (fuel energy) and the battery SOC 10 is kept within a vicinity of the charge sustaining level 16.

The vehicle may also operate with the CD and CS modes 12, 14 in any order, or with CD and CS modes 12, 14 occurring multiple times during a key cycle. Furthermore, the vehicle may be operated in CS mode 14 at a battery SOC 10 above charge sustaining level 16, either based on a user selection, vehicle management, or the like, and then be operated in a CD mode 12 to use additional battery power.

In order to extend operational flexibility, the user may have the ability to select among several operating modes. One user-selectable operating mode is a Hybrid Electric Vehicle (HEV) mode 18 (sometimes referred to as EV-LATER), where the engine is used (with or without help from the motor) for vehicle propulsion. The user-selectable HEV mode 18 is an example of a CS mode 14 of operation for a hybrid vehicle.

Another user-selectable operating mode is an Electric Vehicle (EV) mode 20 (sometimes referred to as EV-NOW), where the electric motor is primarily used for vehicle propulsion, depleting the battery up to its maximal allowable discharging rate under certain driving patterns/cycles. The user-selectable EV mode 20 is an example of a CD mode 12 of operation for a hybrid vehicle. During an EV mode 20, the battery charge may increase in some circumstances, for example due to a period of regenerative braking. The engine is generally not permitted to operate under a default EV mode 20, but may need to be operated based on a vehicle system state or as permitted by the operator through an override or hybrid operation selection as described further below.

Another user-selectable operating mode is an automatic operating mode (sometimes referred to as EV-AUTO), in which the vehicle operates primarily in the CD mode 12, but is automatically switched to the CS mode 14 when driver demands cross specified thresholds.

The various operating modes permit a user to control the vehicle emissions, noise, and the like along a trip, and to control the source of the power used by the vehicle, i.e. gasoline vs. electricity. When the user selects a preferred operation mode using an interface in the vehicle, such as EV/HEV buttons, the user's inputs may disrupt the normal vehicle energy management strategy. The user has the freedom to actively manage the energy usage for his/her vehicle. The more a user uses the vehicle, the better the user can understand the vehicle energy usage property, which will lead to familiarity and better optimization that the user can exercise with the battery energy usage tool. The manual energy planning feature will not only enable the user to simply select EV/HEV driving modes, but allows the user to actively plan the battery electric energy usage and fuel usage for the trip.

Figure 2:
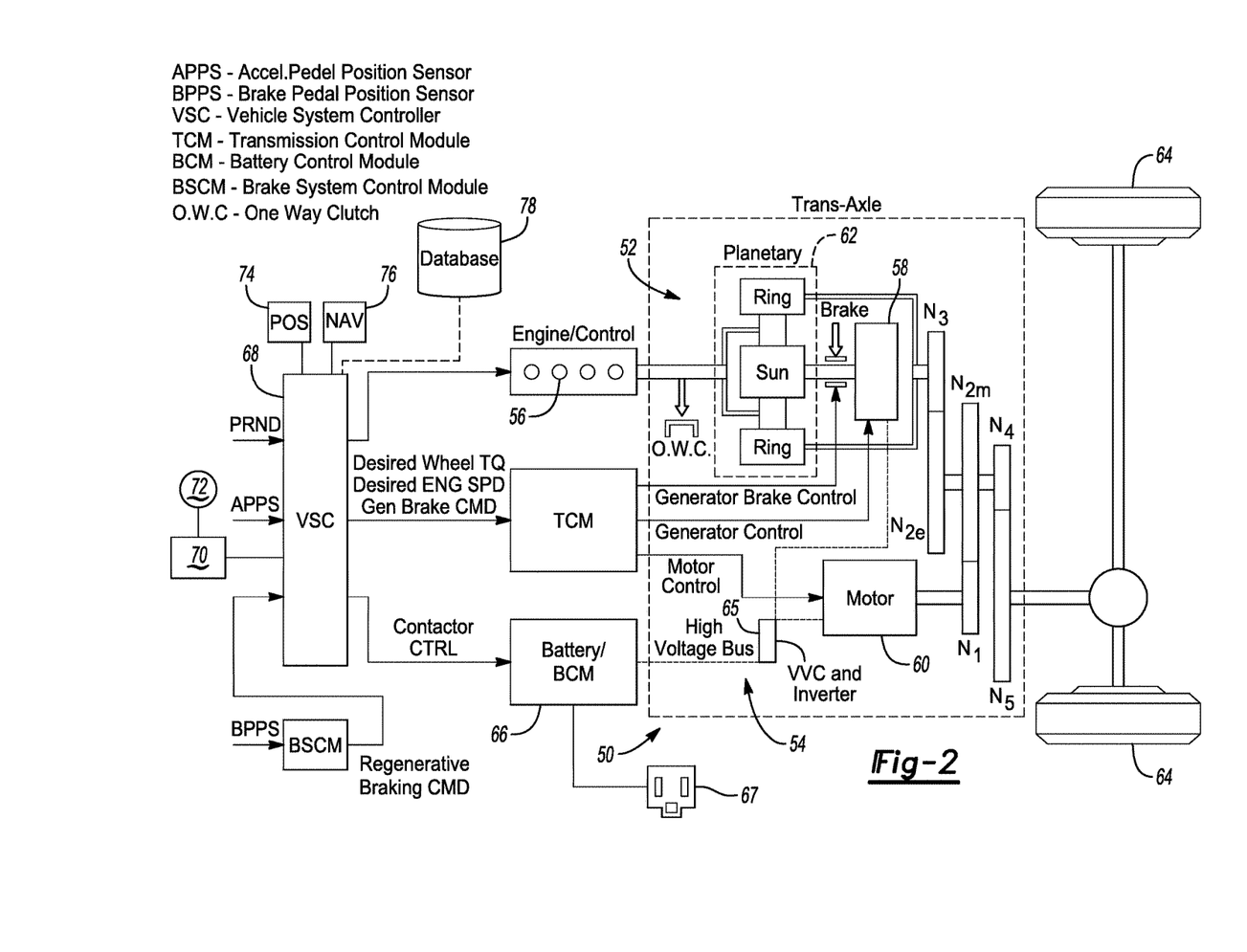
FIG. 2 is a schematic view of an example transmission for a hybrid electric vehicle.

FIG. 2 illustrates one example of a power split hybrid electric vehicle 50 capable of implementing the present disclosure. FIG. 2 illustrates a power split PHEV 50 powertrain configuration and control system, which is a parallel hybrid electric vehicle. In this powertrain configuration, there are two power sources 52, 54 that are connected to the driveline. Of course, the PHEV 50 may be any hybrid vehicle as is known in the art that has an interface permitting the user to select or control the operating mode.

The first power source 52 is a combination of engine and generator subsystems using a planetary gear set to connect to each other. An engine 56 is fueled by gasoline or another fuel contained in a fuel tank (not shown) in fluid communication with the fuel injectors or another fuel delivery system for the engine 56. The fuel tank may be refueled by a user. The fuel tank may be instrumented with a fuel sensor, which is configured to measure the fuel level, fuel flow to the engine, a refueling event, other fuel parameters as are known in the art. The fuel sensor is in communication with a controller to provide the fuel related data or measurements to the controller.

The second power source 54 is an electric drive system (motor, generator, and battery subsystems). The battery subsystem is an energy storage system for the generator and the motor and includes a traction battery. During operation of the vehicle 50 using the second power source 54, an electric motor 60 (e.g., a traction motor) draws power from a battery 66 (e.g., a traction battery) and provides propulsion independently from the engine 56 to the vehicle 50 for forward and reverse motions. An inverter 65 may be positioned between the battery 66 and the electric machine 60 and generator 58. The inverter 65 may include a variable voltage converter as well. This operating mode is called "electric drive." In addition, the generator 58 can draw power from the battery 66 and drive against a one-way clutch coupling on the engine output shaft to propel the vehicle forward. The generator 58 can propel the vehicle forward alone when necessary.

The battery 66 may be recharged or partially recharged using a charging adapter 67 connected to a charging station powered by an external power source, such as the electrical grid, a solar panel, and the like. In one embodiment, the charging adapter 67 contains an inverter and/or a transformer on-board the vehicle.

The operation of this power split powertrain system, unlike conventional powertrain systems integrates the two power sources 52, 54 to work together seamlessly to meet the user's demand without exceeding the system's limits (such as battery limits) while optimizing the total powertrain system efficiency and performance. Coordination control between the two power sources is needed.

The control system for the vehicle 50 may include any number of controllers, and may be integrated into a single controller, or have various modules. Some or all of the controllers may be connected by a controller area network (CAN) or other system.

As shown in FIG. 2, there is a controller 68 (such as a hierarchical vehicle system controller (VSC)) that performs the coordination control in this power split powertrain system. The controller 68 may issue stop commands and start commands to the engine 56 during vehicle operation. The controller 68 may comprise engine on/off logic that issues stop commands to shut down the engine 56 and start commands to start the engine 56.

Under normal powertrain conditions (no subsystems/components faulted), the controller 68 interprets the user's demands (e.g. PRND and acceleration or deceleration demand), and then determines the wheel torque command based on the user demand and powertrain limits. In addition, the controller 68 determines when and how much torque each power source needs to provide in order to meet the user's torque demand and achieve the operating point (torque and speed) of the engine.

The controller 68 may receive signals or inputs from various sources to control the vehicle. These inputs include a user selected vehicle mode and a vehicle state such as battery state, fuel level, engine temperature, oil temperature, tire pressure, and the like. For example, a fuel sensor may be in communication with the controller 68 to provide the fuel related data or measurements to the controller 68. The controller 68 may also be in communication with a vehicle speed sensor.

The controller 68, which includes an electronic control unit (ECU), is connected to or integrated with a human-machine interface (HMI) 70, or user interface. The user interface 70 may include a user input and a display. The user input may be touch screen and/or a series of tactile buttons. The display may be a screen and/or gauges for displaying information to the user.

The controller 68 may also be in communication with a positioning system 74. The positioning system 74 may include a positioning sensor (not shown) that can provide coordinates (e.g., latitude and longitude information) for the vehicle 50 to the controller 68. The controller 68 may also be in communication with a navigation system 76 that can provide route and map information, as well as coordinates of a destination location. The positioning system 74 and the navigation system 76 may be discrete components, or may be an integral unit. The positioning system 74 and/or the navigation system 76 may be, for example, an in-vehicle GPS or Assisted GPS system. Assisted GPS, or aGPS, modules utilize cellular communications data to improve the time to fix a location. In other approaches, the positioning system 74 and/or the navigation system 76 may comprise a location-enabled mobile device such as a cellular phone or standalone GPS unit. Other configurations are also possible. Information provided by either or both of the positioning system 74 and the navigation system 76 may be accessible to the user through the user interface 70.

As explained in detail below, current and past vehicle coordinates may be stored in a database 78 associated with the controller 68, the positioning system 74, and/or the navigation system 76. Further, the controller 68 may recall the stored coordinates from the database 78 for use in controlling the vehicle 50. The database 78 may be contained within memory of the controller 68 or within an external memory device (not shown) in communication with the controller 68. Vehicle coordinates may be stored in non-transitory computer readable storage media or devices, including volatile, persistent, and/or permanent memory devices such as random access memory (RAM) or keep-alive memory (KAM), for example. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 68 to directly or indirectly control operation of the vehicle 50.

A user input 72 such as an EV button may be incorporated into the human machine interface 70 to allow the user to manually select between EV, HEV, and automatic operational modes for the vehicle. The user input 72 allows the user to pre-determine and control the vehicle operation mode among EV, HEV, and automatic (controller 68 selected) modes for a charge cycle or a key cycle.

Providing for user selection of operational modes permits a user to control the source of the power used by the vehicle, i.e. gasoline vs. electricity. For example, a user driving in a city environment may prefer to operate the vehicle in EV mode, which generally provides improved fuel efficiency when the vehicle frequently accelerates and decelerates, as is typically associated with city driving. In the user-selected EV mode, the vehicle 50 operates in a charge depletion (CD) mode and the engine 56 may be disabled. Similarly, a user driving on a highway may prefer to operate the vehicle in HEV mode, which generally provides improved fuel efficiency at higher speeds associated with highway driving, as compared to EV mode.

In many instances, however, after setting a desired user selection of PHEV operation, a user may forget or may not know to switch to a different operational mode when entering a different driving environment. For example, after selecting the HEV mode while driving on a highway, a user subsequently entering a city environment may forget to switch to a typically more efficient EV mode. Conversely, after selecting the EV mode while driving in a city environment, a user subsequently entering a highway may forget to switch to a typically more efficient HEV mode.

Figure 3:
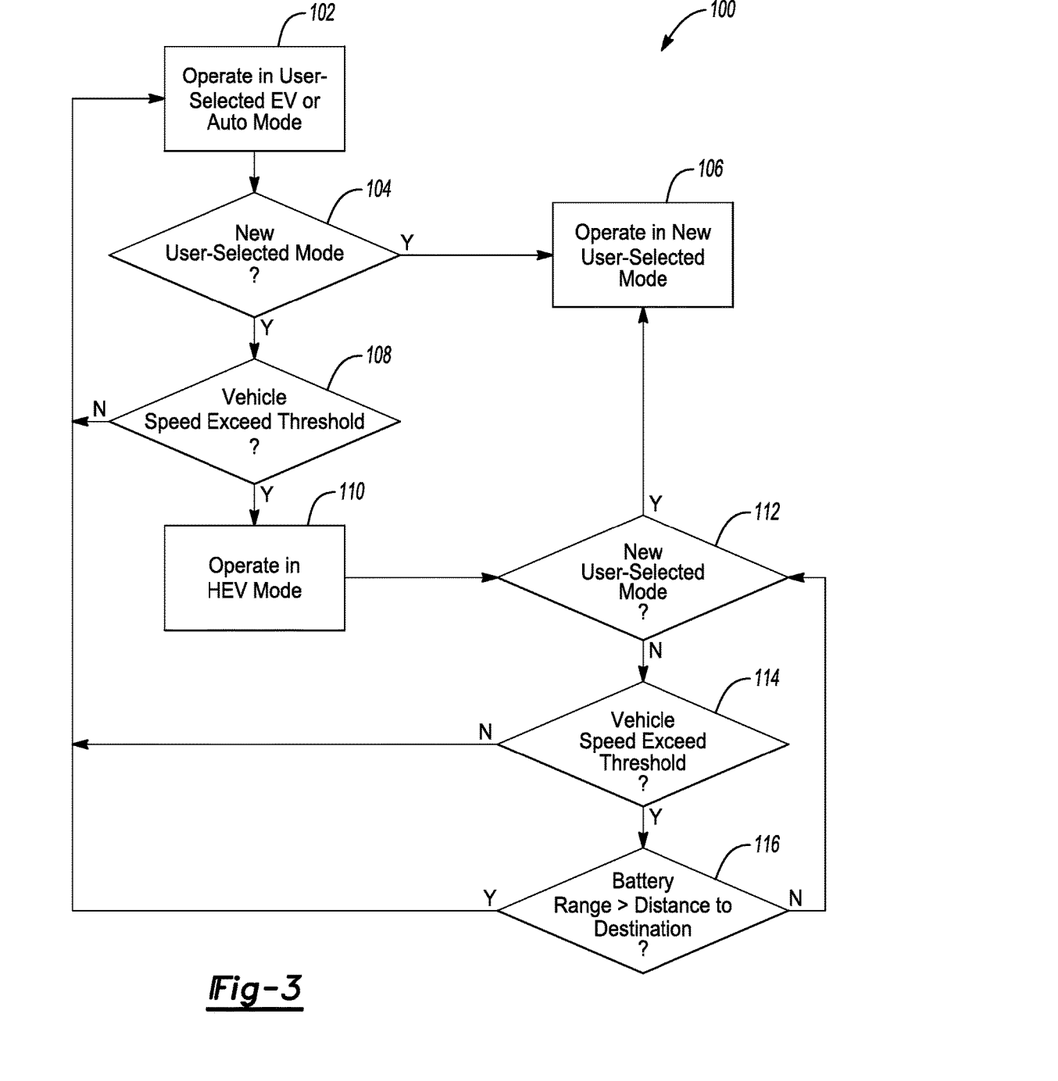
FIG. 3 is a flow chart illustrating an embodiment of an algorithm for automatic mode selection in a hybrid electric vehicle.

FIG. 3 illustrates an embodiment of an algorithm 100 for implementing a system override of a user selected operation mode. The algorithm 100 provides for a system override of the user selected EV or automatic (controller 68 selected) mode of operation based on a vehicle 50 state making EV operation undesirable, or the vehicle state requiring the engine 56 to be enabled. The algorithm 100 causes the engine 56 to be enabled such that the vehicle can operate in an HEV mode when these vehicle states occur. The algorithm 100 returns to the user selected mode of operation when the vehicle state that caused enabling the engine 56 ceases to exist or when certain other conditions are met. The algorithm 100 then re-disables the engine 56 and operates the vehicle in the user selected EV mode.

The algorithm 100 begins at 102, where the vehicle 50 operates in the user-selected EV or automatic mode of operation. For the user-selected EV or automatic modes, the user has, for example, requested the desired mode of operation using the input 72 through the user interface 70. The algorithm 100 proceeds to 104 to determine if the user has selected a new mode of operation. The selection of a new mode of operation may be, for example, a user selection at input 72 that instructs the vehicle 50 to switch to HEV mode (from either EV mode or automatic mode), to switch to automatic mode (from EV mode), or to switch to EV mode (from automatic mode). The determination of whether the user has selected a new mode of operation may be performed, for example, by the controller 68 or other controller based on a selection received at the input 72, as well as other vehicle states such as the engine 56 being enabled or disabled and/or the electric machine 60 being enabled or disabled.

If the user has selected a new mode of operation, the algorithm 100 proceeds to 106, where the vehicle 50 is operated in the new user-selected mode of operation.

If the user has not selected a new mode of operation, the algorithm 100 proceeds to 108 to determine if the speed of the vehicle 50 exceeds a predetermined speed threshold. In one aspect, the vehicle speed is be informed by one or more vehicle speed sensors. In another aspect, the vehicle speed may be derived from a Global Positioning System (GPS). In still another aspect, the vehicle speed may be a cruising speed set by a user (e.g., through a cruise control input).

In one approach, the predetermined speed threshold is a fixed speed threshold. The fixed speed threshold may be fixed during manufacture of the vehicle 50. For example, a fixed predetermined speed threshold may be at or above a maximum speed associated with EV mode, such that the engine 56 needs to be enabled to meet the speed requested for the vehicle 50. In this example, the predetermined speed threshold may be set to seventy miles per hour or eighty-five miles per hour, although other speeds may also be used as a threshold. In another approach, the fixed predetermined speed threshold is set by a user and, in some instances, may be modifiable.

In another approach, the predetermined speed threshold is a dynamic speed threshold. For example, a dynamic predetermined speed threshold may be at or above a speed limit for a given road on which the vehicle 50 is traveling. The dynamic predetermined speed threshold may be informed by a GPS and/or navigation system associated with the vehicle 50.

If the vehicle speed at 108 is below the predetermined speed threshold, the algorithm 100 returns to 102 where controller 68 continues to operate the vehicle 50 in the user-selected EV or automatic mode.

If the vehicle speed at 108 is above the predetermined speed threshold, the algorithm 100 proceeds to 110 where the controller 68 operates the vehicle 50 in HEV mode. At this stage, and referring momentarily to FIG. 1, the vehicle 50 may be operated in a CS mode 22, where the vehicle 50 reduces the electric motor propulsion usage to maintain the battery's SOC 10 at a constant or approximately constant level by increasing the engine propulsion usage. In some aspects, the algorithm 100 proceeds to 110 only in response to the controller 68 determining the vehicle speed exceeds the predetermined speed threshold for a predetermined period of time (e.g., 30 seconds).

The controller 68 may further be configured to monitor for subsequent user selections of new modes of operation at 112. The selection of a new mode of operation may be, for example, a user selection at input 72 that instructs the vehicle 50 to switch from HEV mode to either EV mode or automatic mode. This may occur, for example, when a user wants to manually override the selection of HEV mode. If the user has selected a new mode of operation, the algorithm 100 proceeds to 106, where the vehicle 50 is operated in the new mode of operation.

Where the user does not manually override the operation of the vehicle out of HEV mode, the controller 68 monitors the vehicle speed at 114. In response to determining the vehicle has slowed below the predetermined speed threshold, the controller 68 may automatically return the vehicle 50 to the user-selected EV or automatic mode of operation at 102. In some aspects, the algorithm 100 returns to the user-selected EV or automatic mode of operation only in response to the controller 68 determining the vehicle speed is below the predetermined speed threshold for a predetermined period of time (e.g., 30 seconds). The controller 68 may further be configured to return the vehicle 50 to the user-selected EV or automatic mode of operation in response to determining a cruise control setting has been disabled, thereby causing the vehicle speed to drop below the predetermined speed threshold.

If the vehicle speed at 114 is above the predetermined speed threshold, the algorithm 100 proceeds to 116. At this stage, the controller 68 is configured determine a drive mode based on a comparison of the vehicle's proximity to a given location with the SOC of the battery 66.

As previously described, the positioning system 74 informs the controller 68 of the vehicle's present location. Using the vehicle's location, the controller 68 determines the vehicle's proximity to a geographic location, such as the vehicle's destination. The vehicle's proximity may represent an expected drive distance and may be expressed in any suitable measurement (e.g., miles, kilometers, etc.).

In one aspect, the destination is a geographic location provided by the user to the navigation system 76. This may be done through the interface 70, or may be transmitted by another device (e.g., the user's cell phone) to the navigation system 76. Using the vehicle's location, the navigation system 76 determines a proximity of the vehicle 50 to the destination provided by the user.

In another aspect, the destination is a geographic location stored, for example, in the database 78. To this end, the navigation system 76 may include a predictive learning system that learns the locations of destinations often frequented by a user, such as the user's home or principal place of business. Such locations are preferably indicative of locations of one or more electrical charging stations, and may further be informed or confirmed by the user as locations of electrical charging stations. Such locations are stored, for example, in the database 78 and are subsequently made known to the navigation system 76. Using the vehicle's location, the navigation system 76 determines a proximity of the vehicle 50 to the destination stored in the database 78.

The controller 68 also estimates a range of the battery 66. A range of the battery 66 is an expected battery range remaining and is expressed in any suitable measurement (e.g., miles, kilometers, etc.). The range of the battery 66 may be associated, at least in part, upon the SOC 10 of the battery 66. Battery manufacturers typically provide information regarding the energy content (e.g., remaining kWhrs) stored by a battery at a given SOC. This information may be stored in memory, in a look up table for example, and accessed by the controller 68 as needed. In this way, the SOC 10 of the battery 66 is indicative of the distance the vehicle 50 may be propelled by the motor 60 in the Charge Depleting Mode, for example, before the SOC 10 is depleted to or below a predefined threshold (e.g., 50%, 25%, 10%, 5%, or 0%).

The controller 68 may also factor in a driver's prior driving behavior in estimating the range of the battery 66. How a vehicle is driven can be an important factor in determining how long the remaining charge in the battery 66 is expected to last. For instance, aggressive driving behavior may reduce the charge level in the battery 66 more rapidly than relatively conservative driving behavior. To this end, the controller 68 may estimate the battery's range based not only upon the amount of battery energy available in the battery 66 (e.g., battery SOC 10), but also upon an energy consumption profile and/or environmental factors.

At 116 of FIG. 3, the controller 68 compares the estimated range of the battery 66 with the determined proximity of the vehicle 50 to the vehicle's destination. If the battery range is greater than the distance to the vehicle's destination, the controller 68 is configured to return the vehicle 50 to the user-selected EV or automatic mode of operation. Thus, the motor 60 may be used, at least in part, to propel the vehicle 50 despite the vehicle 50 operating at a speed at or above a maximum speed associated with EV mode. In this way, the vehicle 50 is afforded the fuel economy benefits provided by prioritizing use of the motor 60 over the engine 56. Furthermore, the approach described herein reduces the impact of certain inefficiencies of prioritizing use of the motor 60 over the engine 56 (for example, while the vehicle 50 is operated at speeds exceeding those associated with EV mode).

Figure 4:
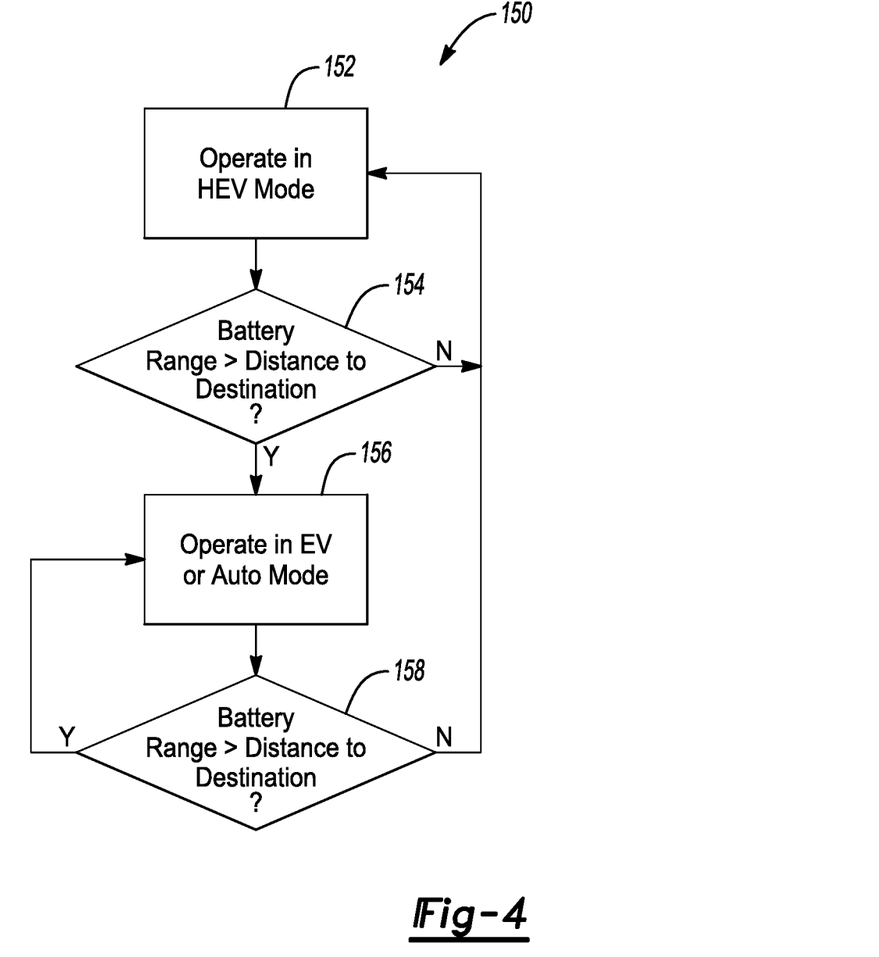
FIG. 4 is a flow chart illustrating another embodiment of an algorithm for automatic mode selection in a hybrid electric vehicle.

FIG. 4 illustrates another embodiment of an algorithm 150 for automatically changing an operation mode from an HEV mode to an EV or automatic mode of operation. The algorithm 150 begins at 152 while the vehicle 50 is operated in the HEV mode. Operation in the HEV mode may be a user-instructed operation, e.g., through the interface 70, or may be automatically selected, e.g., by a controller 68, as discussed elsewhere herein.

The algorithm 150 proceeds to 154. At this stage, the controller 68 is configured determine a drive mode based on a comparison of the vehicle's proximity to a given location with the SOC of the battery 66. In one aspect, the destination is a geographic location provided by the user to the navigation system 76. In another aspect, the destination is a geographic location stored, for example, in the database 78. The controller 68 compares the determined proximity of the vehicle to a destination with an estimated battery range associated with the SOC of the battery 66.

If the estimated battery range is less than the distance to the vehicle's destination, the algorithm 150 returns to 152, where the controller 68 continues to operate the vehicle 50 in the HEV mode.

If the estimated battery range is greater than the distance to the vehicle's destination, the algorithm 150 proceeds to 156, where the controller 68 is configured to switch the vehicle 50 to operate in either EV mode or automatic mode.

In some aspects, at 158, the controller 68 is configured to continue to monitor the relationship between the proximity of the vehicle to a destination and the battery range associated with the SOC of the battery 66. This may be due to changing circumstances associated with the proximity of the vehicle to the destination (e.g., user has taken a route other than the route suggested by the navigation system 76), or changing driving circumstances that cause for a reduction in the battery SOC (e.g., user operation has caused a greater than anticipated drain on the battery SOC). In any approach, upon determining that the battery range is greater than the distance to the vehicle's destination, the algorithm 150 returns to 156, where the controller 68 continues to operate the vehicle 50 in the EV or automatic mode. However, upon determining that the battery range is less than the distance to the vehicle's destination, the algorithm 150 returns to 152, where the controller 68 switches vehicle operation to HEV mode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a vehicle comprising:
    at an engine, propelling the vehicle;
    responsive to a vehicle speed exceeding a predetermined threshold, switching, by a controller, the vehicle from a charge deplete mode to a charge sustain mode; and
    while the vehicle speed exceeds the predetermined threshold, responsive to a range of a battery exceeding an expected drive distance, switching, by the controller, the vehicle from the charge sustain mode to the charge deplete mode.

2. The method of claim 1, wherein a state of charge of a traction battery generally decreases in the charge deplete mode, and wherein the state of charge of the traction battery is generally maintained in the charge sustain mode.

3. The method of claim 1, wherein the range of the battery is a distance associated with a state of charge of the battery.

4. The method of claim 3, wherein the distance associated with the state of charge of the battery is a distance the vehicle may travel before the state of charge is depleted below a predefined threshold.

5. The method of claim 1, wherein the expected drive distance is a distance from a geographic location of the vehicle to a geographic destination.

6. The method of claim 5, wherein the geographic destination is a geographic location entered by a user.

7. The method of claim 5, wherein the geographic destination is a geographic location stored in a memory.

8. A method for controlling a vehicle comprising:
    at an electric machine, propelling the vehicle;
    at a controller,
        responsive to a vehicle speed achieving a predetermined threshold, disabling the electric machine and enabling an engine; and
        while the vehicle speed exceeds the predetermined threshold, responsive to a proximity of the vehicle to a destination being less than a drive range of a traction battery, disabling the engine and enabling the electric machine to propel the vehicle.

9. The method of claim 8, wherein the drive range is a distance associated with a state of charge of the traction battery.

10. The method of claim 9, wherein the distance associated with the state of charge of the traction battery is a distance the vehicle may travel before the state of charge is depleted below a predefined threshold.

11. The method of claim 8, wherein the proximity is a distance from a geographic location of the vehicle to a geographic destination.

12. The method of claim 11, wherein the geographic destination is a geographic location entered by a user.

13. The method of claim 11, wherein the geographic destination is a geographic location stored in a memory.

14. A vehicle comprising:
    an engine;
    an electric machine having an associated battery;
    a sensor that determines a vehicle speed; and
    a controller configured to
        enable the engine responsive to a vehicle speed achieving a predetermined threshold; and
        while the vehicle speed exceeds the predetermined threshold, disable the engine and operate the electric machine to propel the vehicle when a proximity of the vehicle to a destination is less than a drive range of the battery.

15. The vehicle of claim 14, wherein the drive range is a distance associated with a state of charge of the battery.

16. The vehicle of claim 15, wherein the distance associated with the state of charge of the battery is a distance the vehicle may travel before the state of charge is depleted below a predefined threshold.

17. The vehicle of claim 14, wherein the proximity is a distance from a geographic location of the vehicle to a geographic destination.

18. The vehicle of claim 17, wherein the predetermined threshold is a dynamic predetermined threshold that corresponds to a speed limit associated with a road the vehicle is traveling.

19. The vehicle of claim 17, wherein the controller is configured to enable the engine responsive to the vehicle speed achieving the predetermined threshold for a predetermined period of time.

20. The vehicle of claim 17, wherein the controller is further configured to disable the engine and operate the electric machine to propel the vehicle when a cruise control setting has been disabled.

* * * * *